United States Patent
Ai

(10) Patent No.: US 8,304,969 B2
(45) Date of Patent: Nov. 6, 2012

(54) HEAT INSULATION STRUCTURE FOR COOLING FAN

(75) Inventor: Qi Ai, Sinjhuang (TW)

(73) Assignee: Asia Vital Components Co., Ltd., Taipei County (TW)

( * ) Notice: Subject to any disclaimer, the term of this patent is extended or adjusted under 35 U.S.C. 154(b) by 499 days.

(21) Appl. No.: 12/687,096

(22) Filed: Jan. 13, 2010

(65) Prior Publication Data
US 2011/0169379 A1 Jul. 14, 2011

(51) Int. Cl.
*H02K 5/16* (2006.01)
(52) U.S. Cl. .............................. 310/425; 310/90; 310/64
(58) Field of Classification Search .................. 310/90, 310/425, 64; 384/100
See application file for complete search history.

(56) References Cited

U.S. PATENT DOCUMENTS

| 6,504,279 B1 * | 1/2003 | Oelsch et al. ................. 310/90.5 |
| 6,731,456 B2 * | 5/2004 | Grantz et al. ................ 360/99.08 |
| 2003/0107281 A1 * | 6/2003 | Obara ............................ 310/90 |

* cited by examiner

*Primary Examiner* — Nguyen N Hanh

(57) ABSTRACT

A heat insulation structure for cooling fan includes a base, a blade hub, and a stator. The base has a ceramic bearing sleeve, which defines an axial inner space for receiving at least one bearing therein. The bearing has an axial shaft hole; and a heat insulating nanomaterial is applied between the bearing and the bearing sleeve. The blade hub has a plurality of blades and a rotor shaft provided thereon. The rotor shaft has an end connected to the blade hub and another end inserted in the shaft hole on the bearing. The stator is fitted around the bearing sleeve, and a heat insulating nanomaterial is applied between the stator and the bearing sleeve. The ceramic bearing sleeve and the heat insulating nanomaterial together protect the bearing against damage caused by heat produced by windings wound around the stator to thereby largely increase the lifetime of the cooling fan.

7 Claims, 4 Drawing Sheets

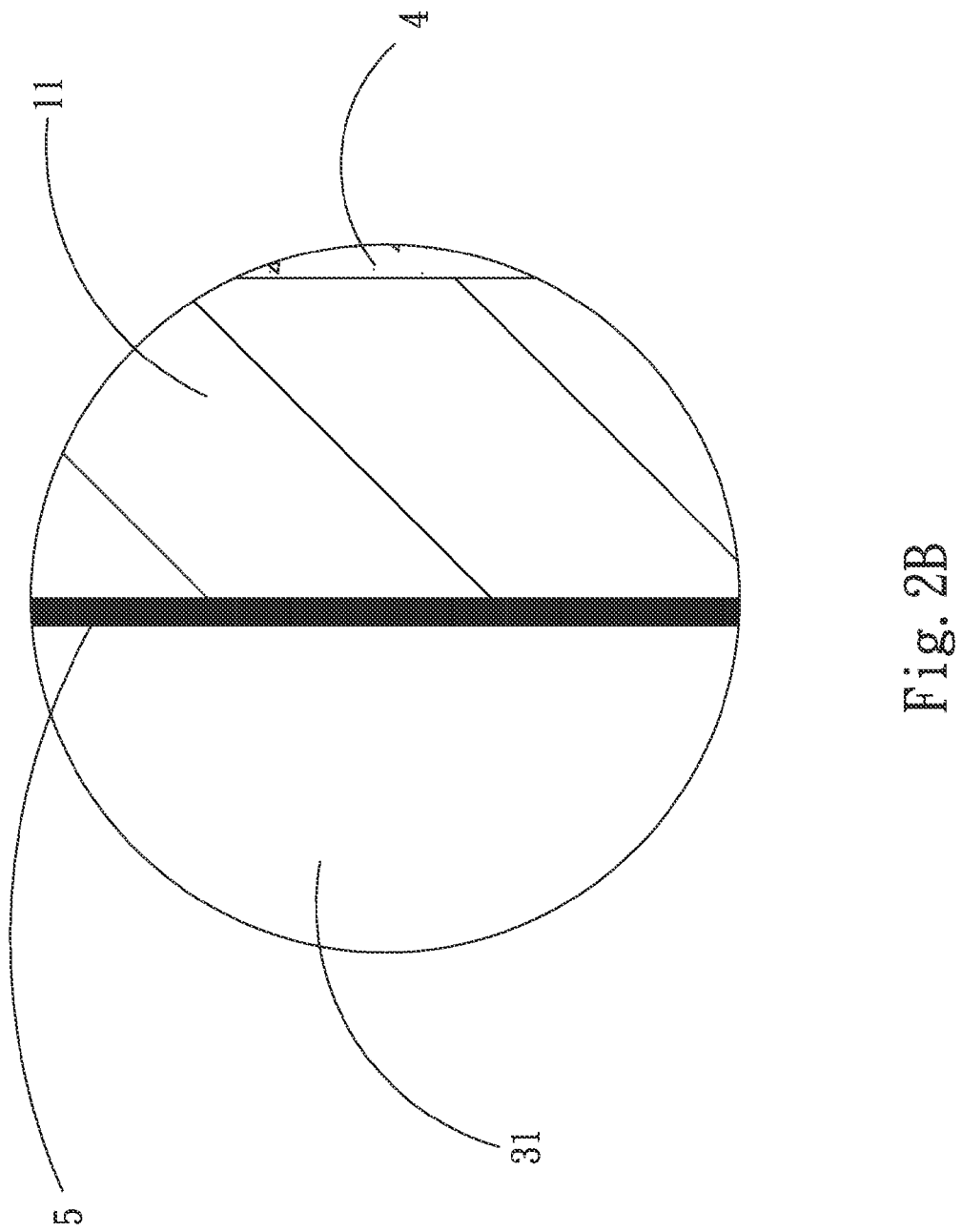

HEAT INSULATION STRUCTURE FOR COOLING FAN

FIELD OF THE INVENTION

The present invention relates to a heat insulation structure for cooling fan, and more particularly to a heat insulation structure for cooling fan that includes a ceramic bearing sleeve for protecting the bearing received therein against damage by isolating the bearing from heat produced by windings during operation of the cooling fan.

BACKGROUND OF THE INVENTION

A cooling fan mainly includes a stator and a rotor. The rotor has a rotor shaft rotatably received in a bearing provided on the stator, and is therefore rotatably supported on the stator to rotate freely.

For the rotor shaft to always smoothly rotate in the bearing, lubricating oil is usually applied between the rotor shaft and the bearing. However, when the cooling fan operates, there is electric current flowing through the windings on the stator to thereby produce heat. The produced heat will transfer from silicon steel plates on the stator and a bearing seat to the bearing, so that the bearing always works under a relatively high temperature, which would cause reduced viscosity and accordingly, increased fluidity of the lubricating oil or lubricating grease in the bearing, resulting in reduced load capacity of the cooling fan as well as quick loss of the lubricating oil from between the bearing and the rotor shaft. Without sufficient lubricating oil for lubricating and cooling, the bearing and the rotor shaft are in frictional contact with each other to cause shortened service life of the rotor shaft and the bearing, and accordingly, of the cooling fan. In conclusion, the conventional cooling fan has the following disadvantages: (1) having excessively high working temperature; (2) having shortened service life; and (3) having poor heat insulation effect.

SUMMARY OF THE INVENTION

It is therefore a primary object of the present invention to provide a heat insulation structure for cooling fan, so as to isolate the bearing of the fan from heat produced by the fan during operation thereof.

Another object of the present invention is to provide a heat insulation structure for cooling fan, so as to increase the lifetime of the cooling fan.

To achieve the above and other objects, the heat insulation structure for cooling fan according to a preferred embodiment of the present invention includes a base, a blade hub, and a stator. The base has a bearing sleeve connected thereto. The bearing sleeve is made of a ceramic material and internally defines an axially extended space with two open ends for receiving at least one bearing therein. The bearing has an axially extended shaft hole; and a heat insulating nanomaterial is applied between the bearing and the bearing sleeve. The blade hub has a plurality of blades and a rotor shaft provided thereon. The rotor shaft has an end connected to the blade hub and another end inserted in the shaft hole on the bearing. The stator is externally fitted around the bearing sleeve, and a heat insulating nanomaterial is applied between the stator and the bearing sleeve. With the bearing sleeve being made of a ceramic material and the heat insulating nanomaterial applied between an inner wall surface of the bearing sleeve and the bearing as well as between an outer wall surface of the bearing sleeve and the stator, the bearing received in the bearing sleeve is isolated from heat produced by windings wound around the stator and accordingly protected against damage caused by such heat. As a result, the lifetime of the cooling fan can be largely increased.

In brief, the heat insulation structure for cooling fan according to the present invention provides the following advantages: (1) increasing the lifetime of the cooling fan; and (2) effectively isolating the bearing from external heat source.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 2B is an enlarged view of the circled area 2B in FIG. 2.

DETAILED DESCRIPTION OF THE PREFERRED EMBODIMENTS

The present invention will now be described with a preferred embodiment thereof with reference to the accompanying drawings.

Figure 1:
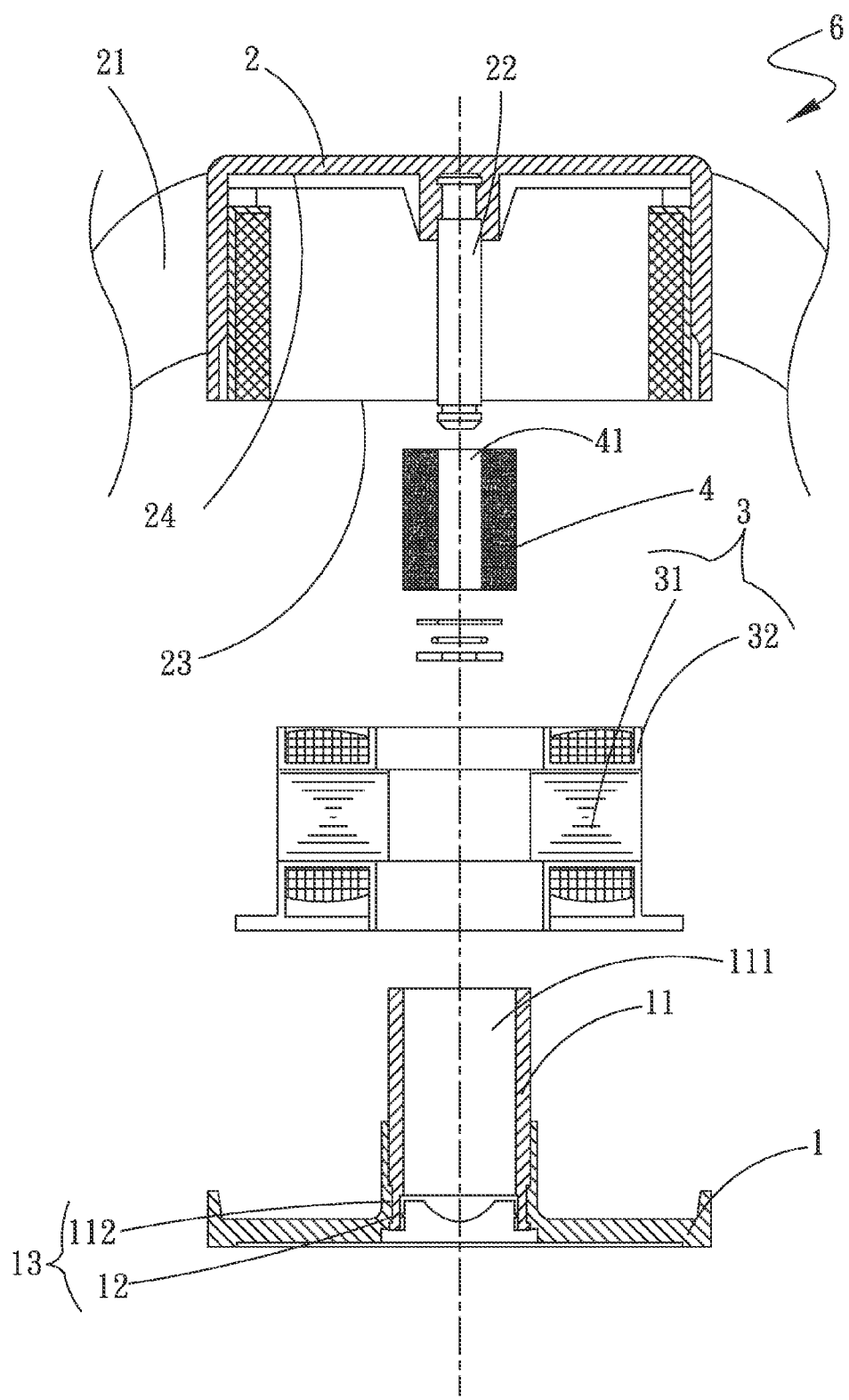
FIG. 1 is an exploded sectional view of a heat insulation structure for cooling fan according to a preferred embodiment of the present invention.
Figure 2:
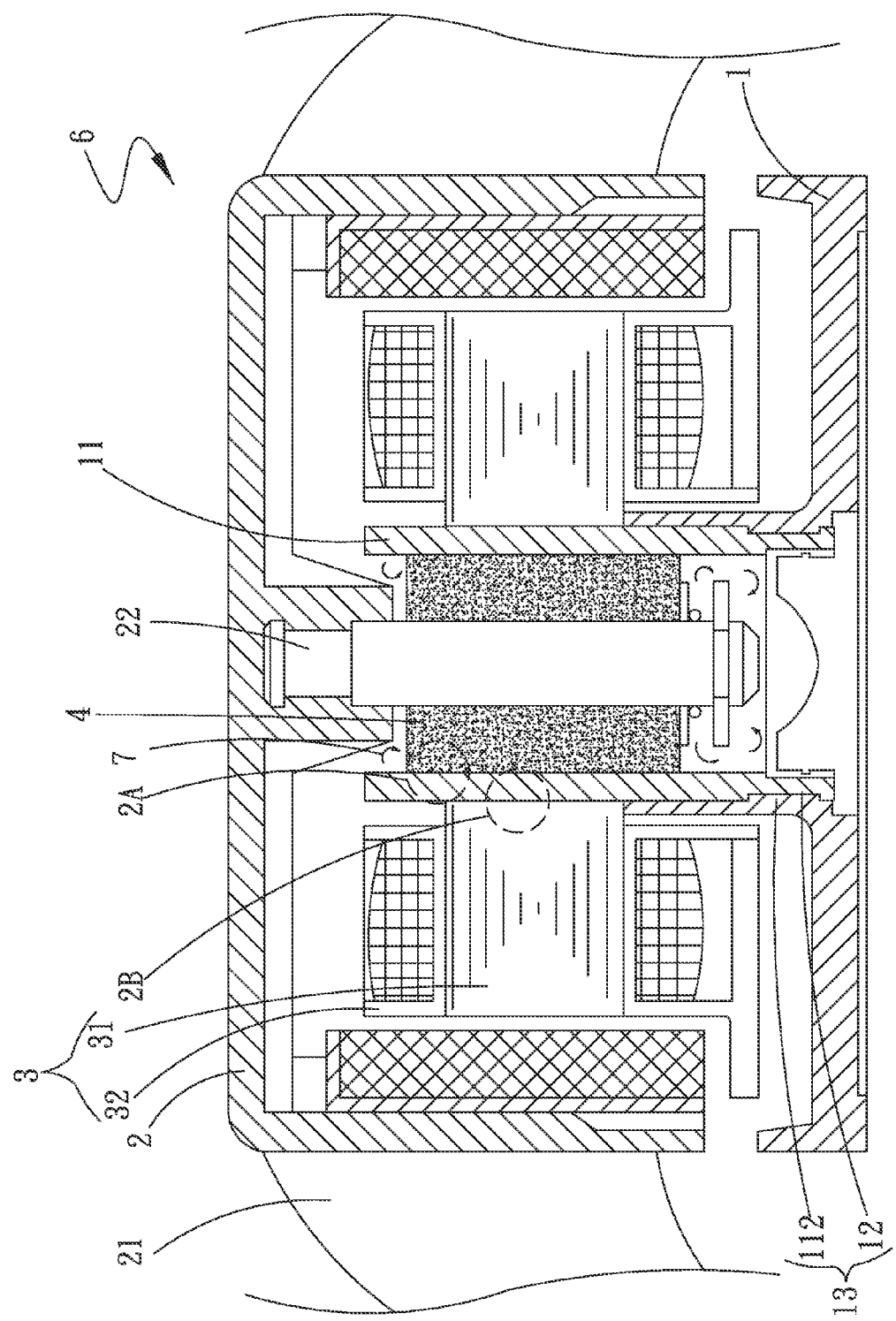
FIG. 2 is an assembled view of FIG. 1.

Please refer to FIGS. 1 and 2, which are exploded and assembled sectional views, respectively, of a heat insulation structure for cooling fan according to a preferred embodiment of the present invention. The cooling fan is generally denoted by reference numeral 6 herein. As shown, the heat insulation structure for the cooling fan 6 includes a base 1, a blade hub 2, and a stator 3.

Figure 2A:
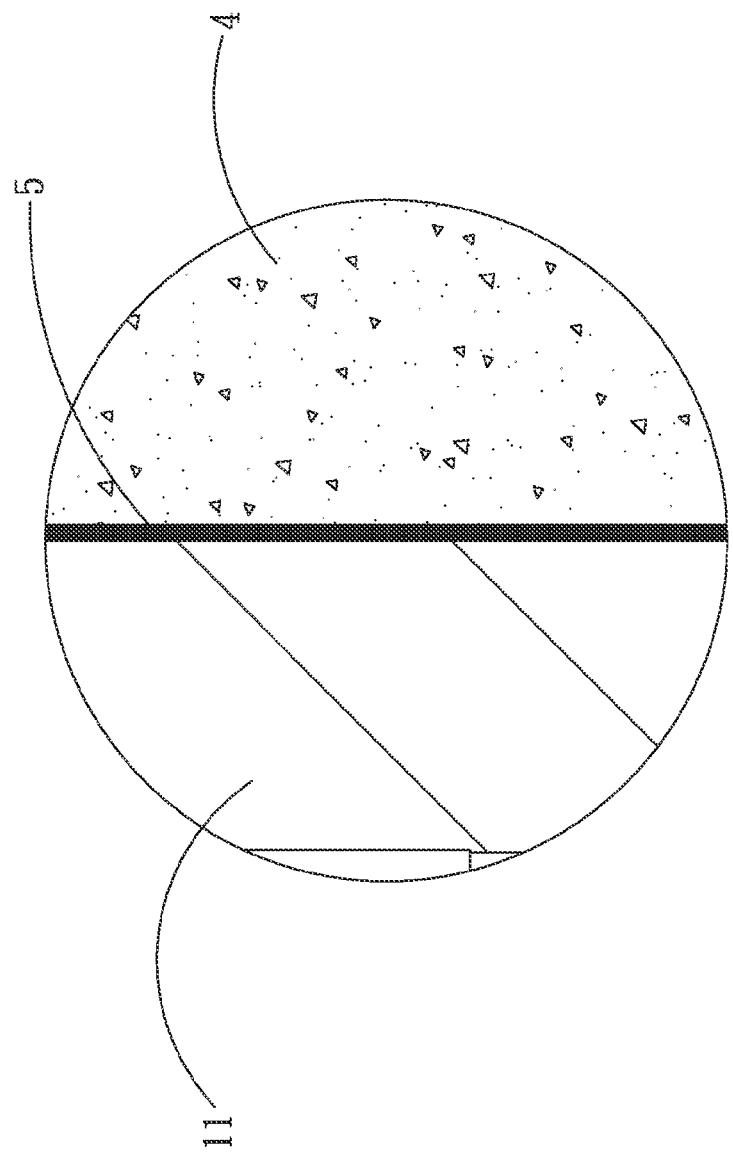
FIG. 2A is an enlarged view of the circled area 2A in FIG. 2.

The base 1 has a bearing sleeve 11 provided thereon. The bearing sleeve 11 is made of a ceramic material and defines an axially extended inner space 111 with two open ends for receiving at least one bearing 4 therein. As can be seen from FIG. 2A, which is an enlarged view of the circled area 2A in FIG. 2, a heat-insulating nanomaterial 5 is applied between the bearing 4 and the bearing sleeve 11. The bearing 4 has an axially extended shaft hole 41.

On the blade hub 2, there are provided a plurality of blades 21 and a rotor shaft 22. The rotor shaft 22 has a first end connected to the blade hub 2 and an opposing second end inserted in the shaft hole 41 of the bearing 4.

The stator 3 is externally fitted around the bearing sleeve 11. As can be seen from FIG. 2B, which is an enlarged view of the circled area 2B in FIG. 2, a heat-insulating nanomaterial 5 is applied between the stator 3 and the bearing sleeve 11.

With the bearing sleeve 11 being made of a ceramic material, which provides good heat insulation effect, the bearing 4 and the rotor shaft 22 are protected against damage or destruction caused by the heat produced during the operation of the cooling fan 6. Moreover, the heat insulating nanomaterial 5 applied between the bearing 4 and the bearing sleeve 11 as well as between the stator 3 and the bearing sleeve 11 further enhances the desired heat insulation effect.

The base 1 is provided at a predetermined position with a protruded portion 112, and the bearing sleeve 11 is also provided at a predetermined position with a recess portion 12 corresponding to the protruded portion 112, so that the protruded portion 112 engages with the recess portion 12 to firmly hold the bearing sleeve 11 to the base 1. The recess portion 12 and the protruded portion 112 together define an engaging mechanism 13 on the cooling fan 6. The blades 21 are outward extended from the blade hub 2 and spaced from one another. The blade hub 2 has an open rear side 23 and a closed front side 24. The first end of the rotor shaft 22 is inserted in the closed front side 24 of the blade hub 2.

The stator 3 includes a plurality of silicon steel plates 31 and a plurality of insulating plates 32. The bearing 4 can be any one of a single-ball bearing (not shown), a dual-ball bearing (not shown), a one-ball and one-sleeve bearing (not shown), a sleeve bearing (not shown), a hydraulic bearing (not shown), a fluid dynamic bearing (not shown), and an oil-impregnated bearing. In the illustrated preferred embodiment of the present invention, the bearing 4 is an oil-impregnated bearing.

The ceramic material can be any one of zirconium oxide, aluminum oxide, and silicon oxide.

The present invention is advantageously characterized in the ceramic bearing sleeve 11, which is able to isolate the bearing 4 received therein from the heat produced by windings wound around the stator 3 when the cooling fan 6 operates. Since the ceramic material is highly heat-resistant and has low heat conductivity, the heat produced by the windings wound around the stator 3 is stopped by the ceramic bearing sleeve 11 from transferring to the rotor shaft 22 and the bearing 4 located in the bearing sleeve 11. Meanwhile, lubricating oil 7 inside the bearing sleeve 11, being isolated from the heat produced by the windings wound around the stator 3, is also protected against reduced viscosity and undesirable loss.

Moreover, the heat insulating nanomaterial 5 applied between the bearing 4 and an inner wall surface of the bearing sleeve 11 as well as between the stator 3 and an outer wall surface of the bearing sleeve 11 also functions to isolate the bearing 4 from the heat produced by the windings located outside the bearing sleeve 11, enabling further enhanced heat insulation effect to largely upgrade the usability of the cooling fan 6.

The present invention has been described with a preferred embodiment thereof and it is understood that many changes and modifications in the described embodiment, such as the configuration or the arrangement of different components thereof, can be carried out without departing from the scope and the spirit of the invention that is intended to be limited only by the appended claims.

What is claimed is:

1. A heat insulation structure for cooling fan, comprising:
   a base having a bearing sleeve vertically connected to a top thereof; the bearing sleeve being made of a ceramic material and defining an axially extended inner space with two open ends for receiving at least one bearing therein; the bearing having an axially extended shaft hole; and a heat insulating nanomaterial being applied between the bearing and an inner wall surface of the bearing sleeve;
   a blade hub having a plurality of blades and a rotor shaft provided thereon; the rotor shaft having a first end connected to the blade hub and an opposing second end inserted in the shaft hole on the bearing; and
   a stator being externally fitted around the bearing sleeve, and a heat insulating nanomaterial being applied between the stator and an outer wall surface of the bearing sleeve.

2. The heat insulation structure for cooling fan as claimed in claim 1, wherein the ceramic material is selected from the group consisting of zirconium oxide, aluminum oxide, and silicon oxide.

3. The heat insulation structure for cooling fan as claimed in claim 1, wherein the blades are outward extended from the blade hub.

4. The heat insulation structure for cooling fan as claimed in claim 1, wherein the stator includes a plurality of silicon steel plates and a plurality of insulating plates.

5. The heat insulation structure for cooling fan as claimed in claim 1, wherein the bearing is selected from the group consisting of a single-ball bearing, a dual-ball bearing, a one-ball and one-sleeve bearing, a sleeve bearing, a hydraulic bearing, a fluid dynamic bearing, and an oil-impregnated bearing.

6. The heat insulation structure for cooling fan as claimed in claim 1, wherein the blade hub includes an open rear side and a closed front side, and the first end of the rotor shaft being inserted in the closed front side.

7. The heat insulation structure for cooling fan as claimed in claim 1, wherein the base is provided at a predetermined position with a protruded portion, and the bearing sleeve is provided with a recess portion corresponding to the protruded portion on the base; and the protruded portion being engaged with the recess portion to fixedly hold the bearing sleeve to the base; and the protruded portion and the recess portion together defining an engaging mechanism.

* * * * *